(12) United States Patent
Carlén Andersson et al.

(10) Patent No.: US 11,608,807 B2
(45) Date of Patent: Mar. 21, 2023

(54) METHOD FOR STARTING OPERATION OF AN INTERNAL COMBUSTION ENGINE

(71) Applicant: VOLVO TRUCK CORPORATION, Gothenburg (SE)

(72) Inventors: Johan Carlén Andersson, Lund (SE); Fredrik Rahm, Hörby (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 17/616,618

(22) PCT Filed: Jun. 5, 2019

(86) PCT No.: PCT/EP2019/064726
§ 371 (c)(1),
(2) Date: Dec. 3, 2021

(87) PCT Pub. No.: WO2020/244757
PCT Pub. Date: Dec. 10, 2020

(65) Prior Publication Data
US 2022/0228546 A1    Jul. 21, 2022

(51) Int. Cl.
*F02D 41/06*    (2006.01)
*F02N 99/00*    (2010.01)
(Continued)

(52) U.S. Cl.
CPC .......... *F02N 99/006* (2013.01); *F02M 26/05* (2016.02); *F02M 26/34* (2016.02); *F02N 9/04* (2013.01)

(58) Field of Classification Search
CPC ......... F02N 99/006; F02N 9/04; F02M 26/05; F02M 26/34
See application file for complete search history.

(56) References Cited

U.S. PATENT DOCUMENTS 6,435,166 B1    8/2002  Sato et al.
7,050,900 B2 *  5/2006  Miller ..................... F02B 69/06
                                                          701/112
(Continued)

FOREIGN PATENT DOCUMENTS

DE          4025565 A1    2/1992
DE     102015216126 A1    3/2017
(Continued)

OTHER PUBLICATIONS

International Search Report and Written Opinion of the International Searching Authority, PCT/EP2019/064726, dated Feb. 19, 2020, 17 pages.
(Continued)

*Primary Examiner* — Gonzalo Laguarda
(74) *Attorney, Agent, or Firm* — Sage Patent Group (57) ABSTRACT

The invention relates to a method for starting operation of an internal combustion engine, wherein the method comprises the steps of: when the internal combustion engine is not operating, providing pressurized gas in the air intake duct; opening the intake valve in a first cylinder while keeping the exhaust valve of the first cylinder closed so as to allow the pressurized gas to enter the first cylinder, press onto the corresponding piston and thereby move the corresponding piston and rotate the crank shaft; supplying fuel to at least one of the cylinders where the corresponding piston has performed or is performing a compression step so as to ignite the fuel and start operation of the engine.

26 Claims, 5 Drawing Sheets

(51) Int. Cl.
    *F02M 26/05*     (2016.01)
    *F02M 26/34*     (2016.01)
    *F02N 9/04*     (2006.01)

(56) References Cited

U.S. PATENT DOCUMENTS

| | | | |
|---|---|---|---|
| 8,793,999 B2 | 8/2014 | Rebhan et al. | |
| 9,016,044 B2 * | 4/2015 | Mafrici | F02M 26/20 60/284 |
| 10,487,789 B2 * | 11/2019 | Money | F02D 41/062 |

FOREIGN PATENT DOCUMENTS

| | | |
|---|---|---|
| EP | 2415990 A1 | 2/2012 |
| JP | 2014234733 A | 12/2014 |
| WO | WO 2014/009770 A1 | 1/2014 |

OTHER PUBLICATIONS

International Preliminary Report on Patentability, PCT/EP2019/064726, dated Apr. 23, 2021, 40 pages.

\* cited by examiner

METHOD FOR STARTING OPERATION OF AN INTERNAL COMBUSTION ENGINE

CROSS REFERENCE TO RELATED APPLICATIONS

This application is a 35 U.S.C. § 371 national stage application of PCT International Application No. PCT/EP2019/064726 filed on Jun. 5, 2019, the disclosure and content of which is incorporated by reference herein in its entirety.

TECHNICAL FIELD

The invention mainly relates to a method for starting operation of an internal combustion engine and to an engine adapted for such a method.

The invention can typically be applied in heavy-duty vehicles, such as trucks, buses and construction equipment. Although the invention will be described with respect to a truck it is not restricted to this particular vehicle but may also be used in other vehicles, vessels and stationary applications.

BACKGROUND

Starting of internal combustion engines provided with pistons connected to a crankshaft and arranged to reciprocate in a corresponding cylinder involves rotating the crank shaft and injecting or in some other way supplying fuel into the cylinders at a suitable point in time, i.e. when the corresponding piston is in or close to a top dead center (TDC) position after having performed a compression stroke. Rotation of the crankshaft (cranking) is commonly carried out by operating an electric motor. Such electric starter motors are relatively costly and add to the weight and the old idea of starting the engine by means of compressed air has gained some recent interest, i.e. to use a pneumatic system including compressed air stored in accumulators where pressurized air is fed to the cylinders via intake valves and used to press onto and move the piston, which before introducing the pressurized air has been set in a suitable position (after TDC but before bottom dead center BDC), so as to rotate the crankshaft. However, conventional pneumatic starter systems require additional equipment and additional space and there is a desire for improved starting systems and methods.

DE102015216126 discloses an engine equipped with an electrically drivable turbo compressor arranged in the intake duct where the compressor can be used for pneumatically positioning the piston before start and starting the engine without the use of e.g. accumulators for compressed air. However, turbo compressors are designed for large gas flows and it therefore seems that the electrically drivable turbo compressor would require a considerable drive power for the very small gas flows used prior to and during cranking of the engine.

There is thus still a need for improved starting systems and methods for internal combustion engines.

SUMMARY

An object of the invention is to provide a method for starting operation of an internal combustion engine that is more efficient than known methods. This object is achieved by the method according to claim 1. Further objects are e.g. to provide an internal combustion engine adapted to said method and a vehicle provided with such an engine. These further objects are achieved by the corresponding independent claims.

The invention relates to a method for starting operation of an internal combustion engine, wherein the engine comprises: a set of one or more cylinders, each cylinder in said set being provided with an intake valve and an exhaust valve arranged to regulate a flow of gas into and out from the cylinder, respectively, and a piston arranged to move back and forth in the cylinder; a crank shaft operatively connected to each piston so as to rotate when the piston(s) move(s) back and forth in the corresponding cylinder; a fuel supply system arranged to supply fuel to the cylinder(s); an air intake duct arranged to feed intake air to the cylinder(s); an exhaust duct arranged to feed exhaust gas away from the cylinder(s); and an exhaust gas recirculation (EGR) system comprising an EGR conduit arranged to connect the exhaust duct and the air intake duct so as to allow recirculation of exhaust gas through the cylinder(s) during operation of the engine, wherein the method comprises the steps of: when the internal combustion engine is not operating, providing pressurized gas in the air intake duct; opening the intake valve in a first cylinder while keeping the exhaust valve of the first cylinder closed so as to allow the pressurized gas to enter the first cylinder, press onto the corresponding piston and thereby move the corresponding piston and rotate the crank shaft; and supplying fuel to at least one of the cylinders where the corresponding piston has performed or is performing a compression step so as to ignite the fuel and start operation of the engine.

In the inventive method the pressurized gas is provided by: closing the air intake duct upstream the EGR conduit and closing the exhaust duct downstream the EGR conduit so as to form a closed recirculation loop comprising the EGR conduit for gas contained in the closed recirculation loop; and operating a controllable gas feeding device arranged in the closed recirculation loop while keeping the intake valve(s) closed, wherein the gas feeding device is configured to feed gas from an inlet to an outlet thereof and wherein the gas feeding device is operated so that a pressure of the gas contained in the closed recirculation loop is increased in the air intake duct and decreased in the exhaust duct.

Besides making it possible to avoid costly electric starters and bulky systems with accumulators for pressurized air, the inventive method does not only increase the pressure on the intake side as in DE102015216126 but also significantly reduces pressure on the exhaust side, which means that it provides for a higher pressure difference over the engine/cylinders. In turn, this provides for a more efficient blow start procedure. In addition, using the gas/air contained in the closed recirculation loop and recirculating that gas instead of feeding outside air through the engine results in a higher temperature of the pressurized gas, in particular at cold (winter) conditions. An increased gas/air temperature facilitates strongly self-ignition of the fuel, and this is therefore a significant advantage for diesel engines.

In principal the engine may be provided with any number of cylinders, for instance one single cylinder or six cylinders (where the latter may be seen as a typical example), and if there is a plurality of cylinders it is optional which cylinder or cylinders that is/are used for the rotation of the crankshaft before ignition and which cylinder is used for the first fuel ignition.

One certain selected cylinder may be set in a suitable starting position already when switching off the engine or in an early step before initiating the actual starting method, and this selected cylinder will then receive the first "load" of pressurized gas. In another example sensors are used to determine the position of all cylinders so that when about to start the engine one of cylinders that is in a suitable position (or that is close to a suitable position and needs only a minor adjustment of the crankshaft to attain a suitable position) is selected to be the cylinder that will be the first to receive pressurized gas in that particular starting procedure. During the starting process pressurized gas may be fed to one or some selected cylinders or to all cylinders.

At least in theory it is possible to start the engine, i.e. to ignite fuel in one of the cylinders, after only one stroke generated by the pressurized gas. That is, while a piston in a first cylinder performs an intake stroke (i.e. over a crankshaft angle CA of 180°) induced by the pressurized gas, another piston in a second cylinder may perform a compression stroke and fuel may then be introduced and ignited in that second cylinder. In many cases, however, it is suitable to accelerate the crankshaft during some revolutions before supplying and igniting the fuel.

If the engine is provided with a variable valve actuation (VVA) system (for at least one of the cylinders) it is possible to introduce the pressurized gas in a two-stroke manner, i.e. the intake valve is opened each time the piston passes its TDC and is closed each time the piston passes its BDC (and the exhaust valve is kept closed when the intake valve is open and vice versa). When the engine has started the operation of the valves is switched to regular four-stroke operation. Without VVA the pressurized gas can be introduced into the cylinder during the normal intake stroke of the four-stroke cycle. This disclosure is primarily directed to four-stroke engines.

That a closed recirculation loop is formed means that the gas contained in that loop, i.e. a mix of air and some previously produced exhaust gas, is prevented from escaping through the closed air intake and exhaust ducts but allowed to recirculate from the cylinder(s) via the exhaust valve (when open), into and through an upstream part of the exhaust duct, into and through the EGR conduit, into and through a downstream part of the intake duct, and back into the cylinders via the intake valve (when open).

In the starting method the inlet of the gas feeding device is directed towards the exhaust valve(s) and the outlet directed towards the intake valve(s) so as to increase the gas pressure in the intake duct.

A properly chosen type of gas feeding device, such as a positive displacement machine in the form of e.g. a roots blower, installed in a proper position, such as in the EGR conduit, can be used for other purposes than blow-starting of the engine, such as for feeding EGR into a high-pressure intake system, and if the use of such a gas feeding device is already contemplated or even installed in the engine, no additional hardware may be needed for carrying out the method.

A positive displacement machine in the form of e.g. a roots blower generates a flow each turn without internal compression and is therefore more effective in the method described here than a compressor. A positive displacement machine is generally reversible and can generate a similar flow in either direction. By reversing the gas feeding device/positive displacement machine, i.e. by driving it in the opposite direction, the gas in the closed recirculation loop can be made to flow in the opposite direction (by introducing the pressurized gas into the cylinder via the exhaust duct and let the expanded gas exit via the intake valve) so as to rotate the crankshaft backwards. This is useful in situations where it is desired to rotate the crankshaft slightly backwards instead of forwards when setting a piston in a suitable starting position, such as when there is a load coupled via a transmission to the engine/crankshaft.

The fuel supply system is typically a fuel injection system where fuel, such as diesel, is injected into the at least one cylinder.

In an embodiment the method comprises the step of opening an EGR valve arranged to control flow through the EGR conduit. In case the engine is provided with such a valve it must be opened to allow the gas to flow in the closed recirculation loop. However, the gas feeding device may function also as EGR valve and in such a case there may be no separate EGR valve that must be opened.

In an embodiment the air intake duct is closed by closing an intake throttle valve arranged in the air inlet duct upstream of the EGR conduit. Many internal combustion engines are already equipped with an intake throttle valve that is suitable for this purpose.

In an embodiment the exhaust duct is closed by closing an exhaust duct valve arranged in the exhaust duct downstream the EGR conduit. The exhaust duct valve may be, for instance, a closed loop butterfly (CLB) or an engine brake, which are known as such. The exhaust duct valve may be arranged upstream or downstream a turbocharging turbine if such a unit is arranged in the exhaust duct.

In an embodiment the gas feeding device is arranged in the EGR conduit. The gas feeding device can then be used during normal operation of the engine as an EGR valve as mentioned above but also as an EGR pump which is particularly useful for providing an EGR flow in engine systems operating with a very high air pressure on the intake side.

In an embodiment the gas feeding device is a positive displacement machine configured to displace gas from an inlet to an outlet thereof by trapping a fixed amount of gas and forcing that trapped amount of gas from the inlet to the outlet. This means for instance that the gas feeding device, unlike an ordinary compressor, is configured for functioning as a closed valve when not in operation. Preferably, the positive displacement machine is a rotary roots type blower having a pair of rotary members provided with meshing lobes. Although screw compressors or similar is possible to use a roots blower is very suitable in this application.

In an embodiment the method comprises the step of: opening the exhaust valve in the first cylinder when the piston of the first cylinder has reached a bottom dead center (BDC) position so as to allow the now expanded pressurized gas to exit the first cylinder. Although this step may not be necessary for starting the engine it is useful for decreasing the work of moving the piston of the first cylinder back towards and passed a top dead center (TDC) position.

In an embodiment the method comprises the step of: continuing feeding pressurized gas into the set of cylinders while opening and closing the corresponding intake and exhaust valve(s) until the crank shaft reaches a threshold rotational speed; wherein the step of supplying fuel to at least one of the cylinders is carried out when the speed threshold has been reached. This is preferably what is done to accelerate the crankshaft during some revolutions before supplying and igniting the fuel.

In an embodiment the engine is provided with a system for variable control of the intake and exhaust valves, wherein the step of continuing feeding pressurized gas into the set of cylinders while opening and closing the intake and exhaust valve(s) comprises: opening the intake valve of the first or a second cylinder during at least a part of a crank shaft angle (CA) range of around 0-180° and keeping the same intake valve closed at around 180-360°, wherein the piston in the same cylinder is in a top dead center (TDC) position at 0° and 360° CA and in a bottom dead center (BDC) position at 180° CA, and opening the exhaust valve of the same cylinder during at least a part of a crank shaft angle (CA) range of around 180-360° and keeping the same exhaust valve closed at around 0-180° CA. This is the two-stroke manner described further above. The crankshaft ranges given above are approximate and cover also minor adaptations that may be suitable depending on the particular engine. For instance, the first range may e.g. be 0-190° or −5-185°.

In an embodiment the step of supplying fuel to at least one of the cylinders is followed by the steps of: confirming whether fuel ignition occurs and whether the engine has started to operate, and, if not, interrupting supplying fuel, or if so, opening air intake and exhaust ducts so as to open up the closed recirculation loop and allow normal operation of the engine. The step of interrupting supplying fuel is typically followed by reverting to the step of feeding pressurized gas into the set of cylinders while opening and closing the intake and exhaust valve(s) since this step is what typically precedes the step of supplying fuel to at least one of the cylinders. A new attempt to ignite the fuel can then made a little later. The step of supplying fuel during the starting method is thus typically only temporarily interrupted.

In an embodiment the step of confirming whether fuel ignition occurs and whether the engine has started to operate comprises: determining whether the crank shaft rotation speed increases above a threshold value as a result of the step of supplying fuel. Speed sensors useful for this purpose are known as such. It may be noted that if it is determined that the crank shaft rotation speed has increased above the threshold value as a result of the step of supplying fuel it has been confirmed both that fuel ignition occurs and that the engine has started to operate; there is no need to separately confirm fuel ignition and engine operation.

In an embodiment the step of opening intake and exhaust ducts so as to open up the closed recirculation loop and allow normal operation of the engine comprises: setting an operation drive level/power of the gas feeding device to a level desired during operation of the engine. The desired level may depend on the desired level of EGR flow if the gas feeding device is arranged as an EGR pump in the EGR conduit.

In an embodiment the engine is provided with a turbocharger arrangement comprising a turbocharger turbine operatively connected to a turbocharger compressor, wherein the turbocharger compressor is arranged in the air intake duct, wherein the turbocharger turbine is arranged in the exhaust duct so as to drive the turbocharger compressor, and wherein the EGR conduit connects to the air intake duct downstream the turbocharger compressor and connects to the exhaust duct upstream the turbocharger turbine. Such an EGR system is commonly denoted high pressure (HP) EGR. Although the method of this disclosure may be used also for an engine provided with a low pressure (LP) EGR system where the EGR conduit connects upstream the turbo compressor and downstream the turbo turbine, a HP EGR system reduces the volume of gas that is to be pressurized and it dispenses with the need for spinning up the compressor and turbine with the recirculating gas, which would require a higher power of the gas feeding device.

In an embodiment the step of opening the intake valve in the first cylinder is carried out when the piston in the first cylinder is in a position where it has passed a top dead center (TDC) position but has not yet passed a bottom dead center (BDC) position. This means that the piston is in a suitable starting position where it can be pushed by the pressurized air towards the BDC (in line with a regular expansion stroke). The engine may be configured to set a certain or one of the cylinders in such a suitable starting position when switched off so that this certain cylinder or at least one of the cylinders can form the "first cylinder" used in the starting method. This is also described further above.

The invention also relates to an internal combustion engine comprising: a set of one or more cylinders, each cylinder in said set being provided with an intake valve and an exhaust valve arranged to regulate a flow of gas into and out from the cylinder, respectively, and a piston arranged to move back and forth in the cylinder; the engine further comprising: a crank shaft operatively connected to each piston so as to rotate when the piston(s) move(s) back and forth in the corresponding cylinder; a fuel supply system arranged to supply fuel to the cylinder(s); an air intake duct arranged to feed intake air to the cylinder(s); an exhaust duct arranged to feed exhaust gas away from the cylinder(s); an exhaust gas recirculation (EGR) system comprising an EGR conduit arranged to connect the exhaust duct and the intake duct so as to allow recirculation of exhaust gas through the cylinder(s) during operation of the engine; an intake throttle valve arranged in the air inlet duct upstream of the EGR conduit; an exhaust duct valve arranged in the exhaust duct downstream the EGR conduit; a controllable gas feeding device arranged in a closed recirculation loop comprising the EGR conduit and being formed by closing the intake throttle valve and the exhaust duct valve, wherein the gas feeding device is configured to feed gas from an inlet to an outlet thereof and wherein the gas feeding device is configured to be operated so that a pressure of the gas contained in the closed recirculation loop is increased in the intake duct and decreased in the exhaust duct; and a control unit configured to control starting and operation of the engine.

In an embodiment the control unit is configured to perform the steps of the method according to above.

In an embodiment the gas feeding device is arranged in the EGR conduit. The gas feeding device can then be used during normal operation of the engine as an EGR valve as mentioned above but also as an EGR pump which is particularly useful for providing an EGR flow in engine systems operating with a very high air pressure on the intake side, such as when using a high-efficiency turbocharging system.

In an embodiment the gas feeding device is a positive displacement machine configured to displace gas from an inlet to an outlet thereof by trapping a fixed amount of gas and forcing that trapped amount of gas from the inlet to the outlet.

In an embodiment the positive displacement machine is a rotary roots type blower having a pair of rotary members provided with meshing lobes.

In an embodiment the engine is provided with a system for variable control of the intake and exhaust valves.

In an embodiment the engine is provided with a turbocharger arrangement comprising a turbocharger turbine operatively connected to a turbocharger compressor, wherein the turbocharger compressor is arranged in the air intake duct, wherein the turbocharger turbine is arranged in the exhaust duct so as to drive the turbocharger compressor, and wherein the EGR conduit connects to the air intake duct downstream the turbocharger compressor and connects to the exhaust duct upstream the turbocharger turbine.

In an embodiment the engine comprises a variable drive unit arranged to drive the gas feeding device. Preferably, the variable drive unit is an electric motor but it may alternatively be driven by hydraulic, pneumatic or mechanical means.

In an embodiment the control unit is configured to control the drive unit so as to control a flow of gas through the positive displacement machine.

In an embodiment the gas feeding device comprises at least one rotary member operatively connected to the drive unit, wherein the control unit is configured to control a rotation speed of the rotary member.

The invention also relates to a vehicle comprising an internal combustion engine according to above.

The invention also relates to:
- a computer program comprising program code means for performing the steps of the above method when said program is run on a computer;
- a computer readable medium carrying a computer program comprising program code means for performing the steps of the above method when said program product is run on a computer; and
- a control unit for controlling an internal combustion engine according to above, the control unit being configured to perform the steps of the method according to above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
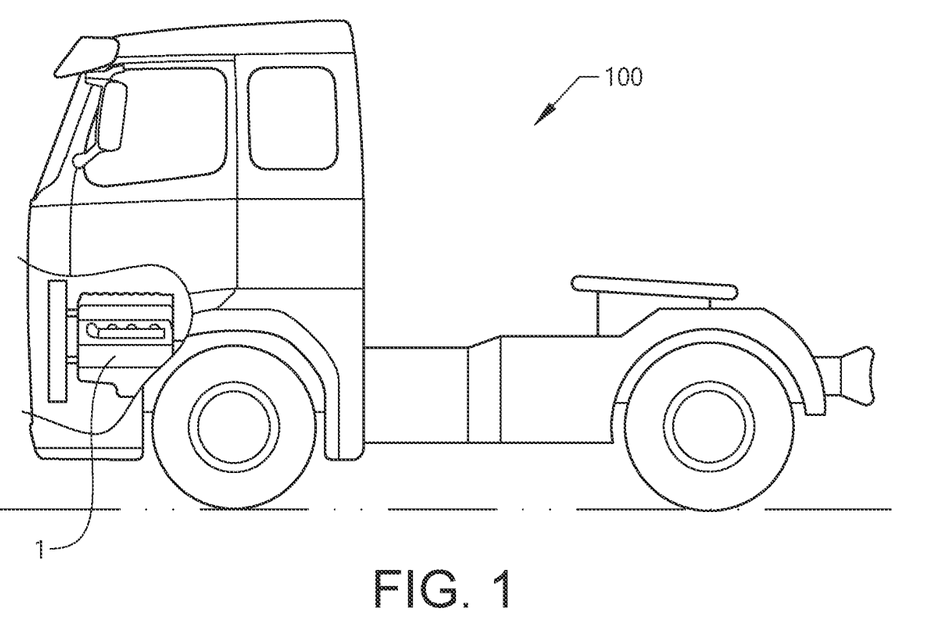
FIG. 1 shows a truck provided with an internal combustion engine according to an embodiment of the invention.

FIG. 1 shows a truck 100 provided with an internal combustion engine 1 according to an embodiment of the invention.

Figure 2:
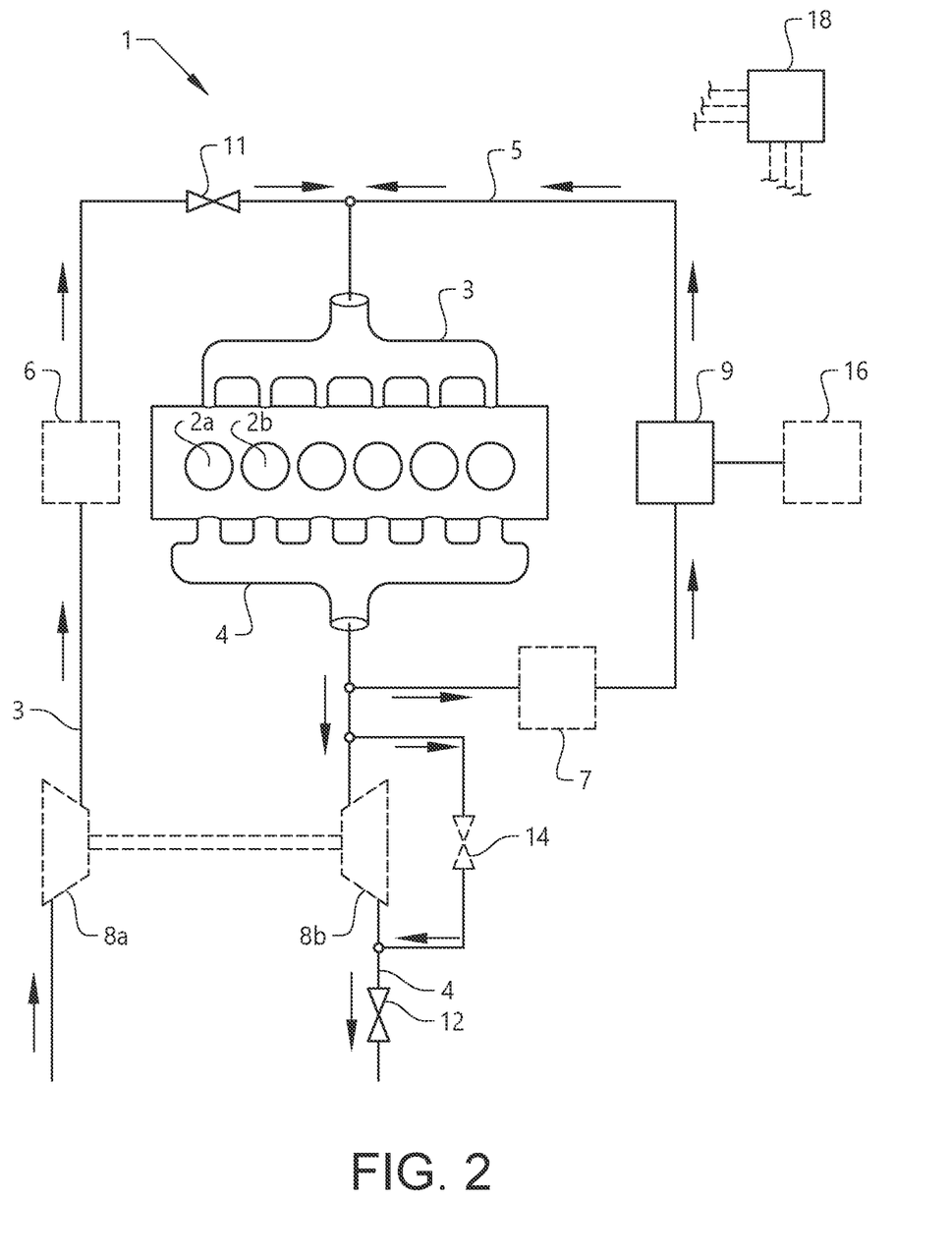
FIG. 2 shows a schematic view of the internal combustion engine of FIG. 1.
Figure 3:
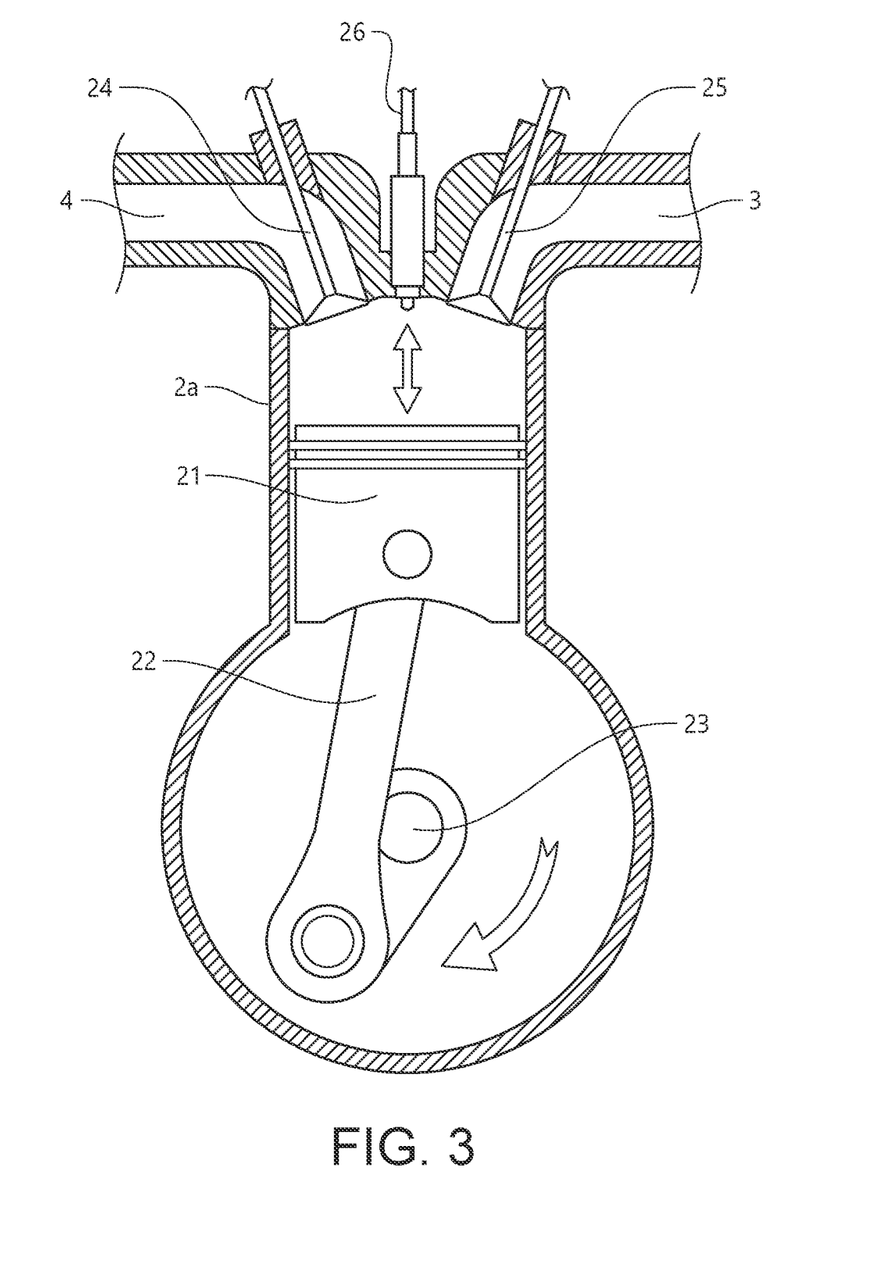
FIG. 3 shows one of the cylinders of the engine of FIG. 2 with a piston operatively connected to a crankshaft and it also shows some other components.
Figure 4:
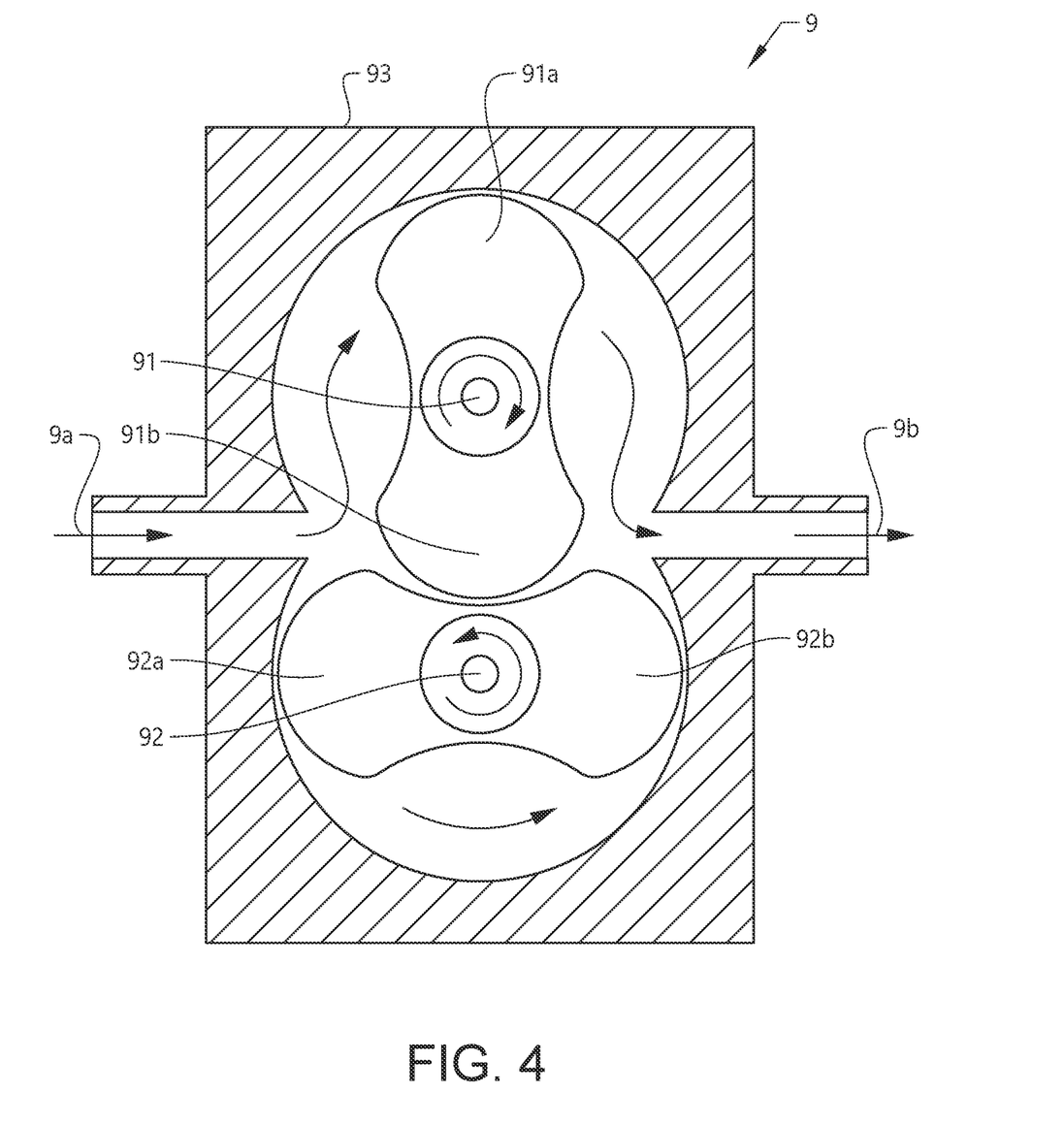
FIG. 4 shows a schematic view of a gas feeding device forming part of the engine of FIG. 2.

FIG. 2 shows a schematic view of the internal combustion engine of FIG. 1 and FIGS. 3-4 show some details of the engine 1, namely a cylinder 2a with associated components (FIG. 3) and gas feeding device 9 (FIG. 4).

As shown in FIGS. 2-4 the exemplified internal combustion engine 1 comprises six similar cylinders 2a, 2b, where each cylinder is provided with an intake valve 25 and an exhaust valve 24 arranged to regulate a flow of gas into and out from the cylinder, respectively, and a piston 21 arranged to move back and forth in the cylinder (see FIG. 3).

The engine 1 further comprises a crank shaft 23 operatively connected via connecting rods 22 to each piston 21 so as to rotate when the pistons move back and forth in the corresponding cylinder 2a, 2b. A fuel supply system 26 in the form of a fuel injection system is arranged to supply fuel to the cylinders 2a, 2b by injecting fuel into each of the cylinders 2a, 2b.

An air intake duct 3 is arranged to feed intake air to the cylinders 2a, 2b and an exhaust duct 4 is arranged to feed exhaust gas away from the cylinders 2a, 2b during operation of the engine 1. The engine 1 is further provided with an exhaust gas recirculation (EGR) system comprising an EGR conduit 5 arranged to connect the exhaust duct 4 and the intake duct 3 so as to allow recirculation of exhaust gas through the cylinders 2a, 2b during operation of the engine 1.

An intake throttle valve 11 is arranged in the air inlet duct 3 upstream of the EGR conduit 5 and an exhaust duct valve 12 in the form of a closed loop butterfly (CLB) valve is arranged in the exhaust duct 4 downstream the EGR conduit 5.

The engine 1 is further provided with a turbocharger arrangement comprising a turbocharger turbine 8b operatively connected, via a shaft, to a turbocharger compressor 8a. The turbocharger compressor 8a is arranged in the air intake duct 3 and the turbocharger turbine 8b is arranged in the exhaust duct 4 so as to drive the turbocharger compressor 8a. As can be seen in FIG. 2 the EGR conduit 5 connects to the air intake duct 3 downstream the turbocharger compressor 8a and connects to the exhaust duct 4 upstream the turbocharger turbine 8b.

An air cooler 6 is arranged in the air intake duct 3 between the turbocharging compressor 8a and the intake throttle valve 11 and an EGR cooler 7 is arranged in the EGR conduit 5. Further, a wastegate 14 is arranged to allow a portion of the exhaust gas to bypass the turbocharging turbine 8b.

The engine 1 is also provided with a (not shown) system for variable control of the intake and exhaust valves 25, 24 allowing the valves 25, 24 to be opened and closed independently of rotational position of the crankshaft 23. Such a system is commonly referred to as variable valve actuation (VVA) and is known as such.

A controllable gas feeding device 9 is arranged in the EGR conduit 5 (downstream the EGR cooler 7). The gas feeding device 9 is a positive displacement machine of a roots blower type having a pair of rotary members 91, 92 provided with meshing lobes 91a, 91b, 92a, 92b and is configured to feed gas from an inlet 9a to an outlet 9b thereof by trapping a fixed amount of gas and forcing that trapped amount of gas from the inlet 9a to the outlet 9b (see FIG. 4).

A controllable and variable drive unit 16 in the form of an electric motor is arranged to drive the gas feeding device 9 so as to control a flow of gas through the gas feeding device 9. The rotary members 91, 92 are operatively connected to the drive unit 16 and by controlling a rotation speed of the drive unit 16 the rotation speed of the rotary members 91, 92 and the gas flow through the gas feeding device 9 can be controlled.

During normal four-stroke operation of the engine 1 the gas feeding device 9 is used as an EGR pump for feeding exhaust gas through the EGR conduit 5 and also as an EGR valve.

By closing the intake throttle valve 11 and the exhaust duct valve 12 it is possible to form a closed recirculation loop comprising the EGR conduit 5, a downstream portion of the air intake duct 3 and an upstream portion of the exhaust duct 4 (see FIG. 2). Gas contained in the pipes and various spaces forming part of this closed loop can thereby be recirculated in this loop (provided that the valves 24, 25 are at least occasionally opened) using the gas feeding device 9. During starting of the engine 1 (and also during normal operation of the engine 1) the gas feeding device 9 is driven so as to pump gas from the exhaust duct 4 to the air intake duct 3. When the closed recirculation loop is formed and the intake valves 25 are closed this results in that a pressure of the gas contained in the closed recirculation loop is increased in the intake duct 3 and decreased in the exhaust duct 4.

The engine is further provided with a control unit or control circuitry 18 configured to receive control signals from various sensors, such as speed sensors for the crankshaft 23 and the rotary members 91, 92 of the gas feeding device 9 and a large number of other sensors, and to send control signals and control the controllable components of the engine 1 and thus to control starting and operation of the engine 1. The control unit 18 is for instance arranged to control the drive unit 16, the valves 24, 25, the air intake duct and exhaust duct valves 11, 12 and the fuel injection system 26. Engine control units, sensors, etc. are well known as such.

Components that are optional with regard to the principle of the invention are indicated with dashed lines in FIG. 2. In practice, however, these components are preferably included to achieve a high engine efficiency.

FIG. 3 is not intended to show any particular moment of the method of this disclosure but simply to show general components and principal function of cylinder 2a, piston 21, crankshaft 23 and valves 24, 25. In FIG. 3 both valves 24, 25 are closed and the piston 21 has passed its BDC closest to crankshaft 23 and is on its way towards its TDC closest to the valves 24, 25. FIG. 3 could thus be seen as a representation of a compression stroke during normal operation of the engine 1. To set the 21 piston in a suitable position for being started by feeding pressurized gas through the air intake duct 3 and into the cylinder 2a via the intake valve 25 (when opened), the crankshaft 23 would need to be rotated around 180° so that the piston 21 gets positioned some degrees after its TDC.

Figure 5:
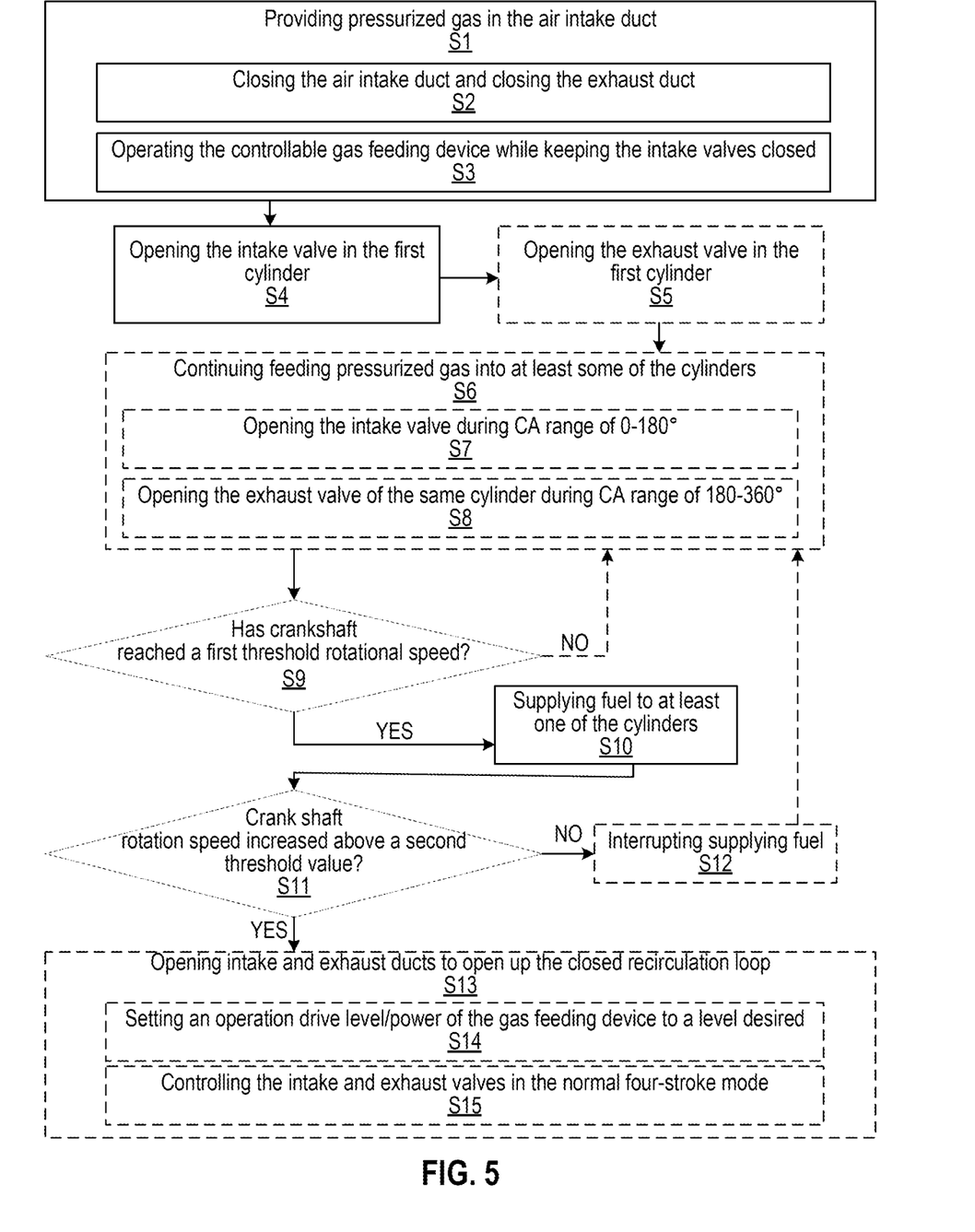
FIG. 5 shows a flow diagram of an embodiment of the inventive method.

FIG. 5 shows a flow diagram of an embodiment of a method for starting operation of the internal combustion engine 1. As shown in FIG. 5 the exemplified method comprises the steps of:

S1—when the internal combustion engine 1 is not operating, providing pressurized gas in the air intake duct 3; by:

S2—closing the air intake duct 3 upstream the EGR conduit 5 (by closing the intake throttle valve 11) and closing the exhaust duct 4 downstream the EGR conduit 5 (by closing the exhaust duct valve 12) so as to form the closed recirculation loop comprising the EGR conduit 5) for gas contained in the closed recirculation loop; and S3—operating the controllable gas feeding device 9 (by means of the drive unit 16) arranged in the closed recirculation loop while keeping the intake valves 25 closed, wherein the gas feeding device 9 is configured to feed gas from the inlet 9a to the outlet 9b thereof and wherein the gas feeding device 9 is operated so that a pressure of the gas contained in the closed recirculation loop is increased in the air intake duct 3 and decreased in the exhaust duct 4 (i.e. the gas contained in the closed recirculation loop is pumped from the exhaust duct 4 to the air intake duct 3);

S4—opening the intake valve 25 in the first cylinder 2a while keeping the exhaust valve 24 of the first cylinder 2a closed so as to allow the pressurized gas to enter the first cylinder 2a, press onto the corresponding piston 21 and thereby move the corresponding piston 21 and rotate the crank shaft (23);

S5—opening the exhaust valve 24 in the first cylinder 2a when the piston 21 of the first cylinder 2a has reached the BDC position so as to allow the now expanded pressurized gas to exit the first cylinder 2a;

S6—continuing feeding pressurized gas into at least some of the cylinders 2a, 2b while opening and closing the corresponding intake and exhaust valves 25, 24 by (in order to achieve the two-stroke introduction of pressurized gas discussed further above):

S7—opening the intake valve 25 of the first or a second cylinder 2a, 2b during at least a part of a crankshaft 23 angle (CA) range of 0-180° and keeping the same intake valve 25 closed at 180-360°, wherein the piston 21 in the same cylinder is in the TDC position at 0° and 360° CA and in the BDC position at 180° CA, and S8—opening the exhaust valve 24 of the same cylinder during at least a part of a crank shaft angle (CA) range of 180-360° and keeping the same exhaust valve 24 closed at 0-180° CA;

S9—determining whether the crankshaft 23 has reached a first threshold rotational speed; and when so:

S10—supplying fuel to at least one of the cylinders 2a, 2b where the corresponding piston has performed or is performing a compression step so as to (at least try to) ignite the fuel and start operation of the engine 1, S11—confirming whether fuel ignition actually occurs and whether the engine 1 actually has started to operate by determining whether the crank shaft 23 rotation speed increases above a second threshold value as a result of the step S10 of supplying fuel, and:

if not, S12—interrupting supplying fuel and reverting to step S6, or if so, S13—opening intake and exhaust ducts 25, 24 (i.e. opening air intake and exhaust duct valves 11, 12) so as to open up the closed recirculation loop and allow normal operation of the engine 1.

Step S13 may typically be complemented with, for instance,

S14—setting an operation drive level/power of the gas feeding device 9 to a level desired during operation of the engine 1, and S15—controlling the intake and exhaust valves 25, 24 in the normal four-stroke mode.

The method above may be preceded by a step of setting the piston 21 in the first cylinder 2a in a position where it has passed its TDC position but has not yet passed its BDC position so as to be set in position suitable for the starting method. This step may be performed already when the engine 1 was switched off (the crankshaft 23 may be controlled to stop at a certain angle). Instead of setting a piston in a certain position this preceding step may comprise selecting one of the cylinders as the "first" cylinder where the piston already is in a suitable position (with many cylinders it is likely that one of the pistons has been set in an at least sufficiently suitable position when switching off the engine without any particular controlling, so any adjustment of the piston position may not be necessary).

The order of the steps indicated above should not be interpreted too strictly. For instance, if there are several cylinders involved step S4 may have been carried out not only for the first cylinder but also for another cylinder before step S5 is carried out for the first cylinder.

And step S6 is a sort of repetition of steps S4 and S5 but (in this example) for several cylinders.

In a simple form the method may comprise only the steps of S1-S4 and S10. However, it is in many applications useful to make use of steps S5-S8 (or at least S5-S6 if the two-stroke approach is not used) to accelerate the rotation speed of the crankshaft 23 and also to check in S9 if its speed is sufficient before introducing fuel into the cylinder in step S10. A verification of whether the engine 1 actually has started as proposed in step S11 is also useful. These optional method steps are indicated with dashed lines in FIG. 5.

It is to be understood that the present invention is not limited to the embodiments described above and illustrated in the drawings; rather, the skilled person will recognize that many changes and modifications may be made within the scope of the appended claims.

The invention claimed is:

1. Method for starting operation of an internal combustion engine, wherein the engine comprises:
    a set of one or more cylinders, each cylinder in said set being provided with an intake valve and an exhaust valve arranged to regulate a flow of gas into and out from the cylinder, respectively, and a piston arranged to move back and forth in the cylinder;
    a crank shaft operatively connected to each piston so as to rotate when the piston(s) move(s) back and forth in the corresponding cylinder;
    a fuel supply system arranged to supply fuel to the cylinder(s);
    an air intake duct arranged to feed intake air to the cylinder(s);
    an exhaust duct arranged to feed exhaust gas away from the cylinder(s); and
    an exhaust gas recirculation system comprising an EGR conduit arranged to connect the exhaust duct and the air intake duct so as to allow recirculation of exhaust gas through the cylinder(s) during operation of the engine;
    wherein the method comprises the steps of:
        when the internal combustion engine is not operating, providing pressurized gas in the air intake duct;
        opening the intake valve in a first cylinder while keeping the exhaust valve of the first cylinder closed so as to allow the pressurized gas to enter the first cylinder, press onto the corresponding piston and thereby move the corresponding piston and rotate the crank shaft;
        supplying fuel to at least one of the cylinders where the corresponding piston has performed or is performing a compression step so as to ignite the fuel and start operation of the engine,
    characterized in
    that the pressurized gas is provided by:
        closing the air intake duct upstream the EGR conduit and closing the exhaust duct downstream the EGR conduit so as to form a closed recirculation loop comprising the EGR conduit for gas contained in the closed recirculation loop;
        operating a controllable gas feeding device arranged in the closed recirculation loop while keeping the intake valve(s) closed, wherein the gas feeding device is configured to feed gas from an inlet to an outlet thereof and wherein the gas feeding device is operated so that a pressure of the gas contained in the closed recirculation loop is increased in the air intake duct and decreased in the exhaust duct.

2. Method according to claim 1, wherein the method comprises the step of opening an EGR valve arranged to control flow through the EGR conduit.

3. Method according to claim 1, wherein the air intake duct is closed by closing an intake throttle valve arranged in the air inlet duct upstream of the EGR conduit.

4. Method according to claim 1, wherein the exhaust duct is closed by closing an exhaust duct valve arranged in the exhaust duct downstream the EGR conduit.

5. Method according to claim 1, wherein the gas feeding device is arranged in the EGR conduit.

6. Method according to claim 1, wherein the gas feeding device is a positive displacement machine configured to displace gas from an inlet to an outlet thereof by trapping a fixed amount of gas and forcing that trapped amount of gas from the inlet to the outlet.

7. Method according to claim 6, wherein the positive displacement machine is a rotary roots type blower having a pair of rotary members provided with meshing lobes.

8. Method according to claim 1, wherein the method comprises the step of:
    opening the exhaust valve in the first cylinder when the piston of the first cylinder has reached a bottom dead center position so as to allow the now expanded pressurized gas to exit the first cylinder.

9. Method according to claim 8, wherein the method comprises the step of:
    continuing feeding pressurized gas into the set of cylinders while opening and closing the corresponding intake and exhaust valve(s) until the crank shaft reaches a threshold rotational speed; wherein the step of supplying fuel to at least one of the cylinders is carried out when the speed threshold has been reached.

10. Method according to claim 9, wherein the engine is provided with a system for variable control of the intake and exhaust valves, wherein the step of continuing feeding pressurized gas into the set of cylinders while opening and closing the intake and exhaust valve(s) comprises:
    opening the intake valve of the first or a second cylinder during at least a part of a crank shaft angle (CA) range of around 0-180° and keeping the same intake valve closed at around 180-360°, wherein the piston in the same cylinder is in a top dead center (TCD) position at 0° and 360° CA and in a bottom dead center (BDC) position at 180° CA, and
    opening the exhaust valve (24) of the same cylinder during at least a part of a crank shaft angle (CA) range of around 180-360° and keeping the same exhaust valve closed at around 0-180° CA.

11. Method according to claim 1, wherein the step of supplying fuel to at least one of the cylinders is followed by the steps of:
    confirming whether fuel ignition occurs and whether the engine has started to operate, and
    if not, interrupting supplying fuel, or
    if so, opening intake and exhaust ducts so as to open up the closed recirculation loop and allow normal operation of the engine.

12. Method according to claim 11, wherein the step of confirming whether fuel ignition occurs and whether the engine has started to operate comprises:
    determining whether the crank shaft rotation speed increases above a threshold value as a result of the step of supplying fuel.

13. Method according to claim 11, wherein the step of opening intake and exhaust ducts so as to open up the closed recirculation loop and allow normal operation of the engine comprises:
   setting an operation drive level/power of the gas feeding device to a level desired during operation of the engine.

14. Method according to claim 1, wherein the engine is provided with a turbocharger arrangement comprising a turbocharger turbine operatively connected to a turbocharger compressor, wherein the turbocharger compressor is arranged in the air intake duct, wherein the turbocharger turbine is arranged in the exhaust duct so as to drive the turbocharger compressor and wherein the EGR conduit connects to the air intake duct downstream the turbocharger compressor and connects to the exhaust duct upstream the turbocharger turbine.

15. Method according to claim 1, wherein the step of opening the intake valve in the first cylinder is carried out when the piston in the first cylinder is in a position where it has passed a top dead center (TDC) position but has not yet passed a bottom dead center (BDC) position.

16. An internal combustion engine comprising:
   a set of one or more cylinders, each cylinder in said set being provided with an intake valve and an exhaust valve arranged to regulate a flow of gas into and out from the cylinder, respectively, and a piston arranged to move back and forth in the cylinder;
   the engine further comprising:
   a crank shaft operatively connected to each piston so as to rotate when the piston(s) move(s) back and forth in the corresponding cylinder;
   a fuel supply system arranged to supply fuel to the cylinder(s);
   an air intake duct arranged to feed intake air to the cylinder(s);
   an exhaust duct arranged to feed exhaust gas away from the cylinder(s);
   an exhaust gas recirculation (EGR) system comprising an EGR conduit arranged to connect the exhaust duct and the intake duct so as to allow recirculation of exhaust gas through the cylinder(s) during operation of the engine;
   an intake throttle valve arranged in the air inlet duct upstream of the EGR conduit;
   an exhaust duct valve arranged in the exhaust duct downstream the EGR conduit;
   a controllable gas feeding device arranged in a closed recirculation loop comprising the EGR conduit, wherein each of the intake throttle valve and the exhaust duct valve (12) is configured to be closable and wherein the closed recirculation loop is formed by closing the intake throttle valve and the exhaust duct valve, wherein the gas feeding device is configured to feed gas from an inlet to an outlet thereof and wherein the gas feeding device is configured to be operated so that a pressure of the gas contained in the closed recirculation loop is increased in the intake duct and decreased in the exhaust duct; and
   a control unit configured to control starting and operation of the engine,
   wherein the control unit is configured to perform the steps of the method according to claim 1.

17. The internal combustion engine according to claim 16, wherein the gas feeding device is arranged in the EGR conduit.

18. The internal combustion engine according to claim 16, wherein the gas feeding device is a positive displacement machine configured to displace gas from an inlet to an outlet thereof by trapping a fixed amount of gas and forcing that trapped amount of gas from the inlet to the outlet.

19. The internal combustion engine according to claim 18, wherein the positive displacement machine is a rotary roots type blower having a pair of rotary members provided with meshing lobes.

20. The internal combustion engine according to claim 16, wherein the engine is provided with a system for variable control of the intake and exhaust valves.

21. The internal combustion engine according to claim 16, wherein the engine is provided with a turbocharger arrangement comprising a turbocharger turbine operatively connected to a turbocharger compressor, wherein the turbocharger compressor is arranged in the air intake duct, wherein the turbocharger turbine is arranged in the exhaust duct so as to drive the turbocharger compressor, and wherein the EGR conduit connects to the air intake duct downstream the turbocharger compressor and connects to the exhaust duct upstream the turbocharger turbine.

22. The internal combustion engine according to claim 16, wherein the engine comprises a variable drive unit arranged to drive the gas feeding device.

23. The internal combustion engine according to claim 22, wherein the control unit is configured to control the drive unit so as to control a flow of gas through the gas feeding device.

24. The internal combustion engine according to claim 23, wherein the gas feeding device comprises at least one rotary member operatively connected to the drive unit, wherein the control unit is configured to control a rotation speed of the rotary member.

25. Vehicle comprising an internal combustion engine according to claim 16.

26. A control unit for controlling an internal combustion engine according to claim 16, the control unit being configured to perform the steps of the method according to claim 1.

* * * * *